July 31, 1923.
C. W. BAKER
TEMPERATURE INDICATING DEVICE
Filed May 17, 1922
1,463,189
2 Sheets-Sheet 1
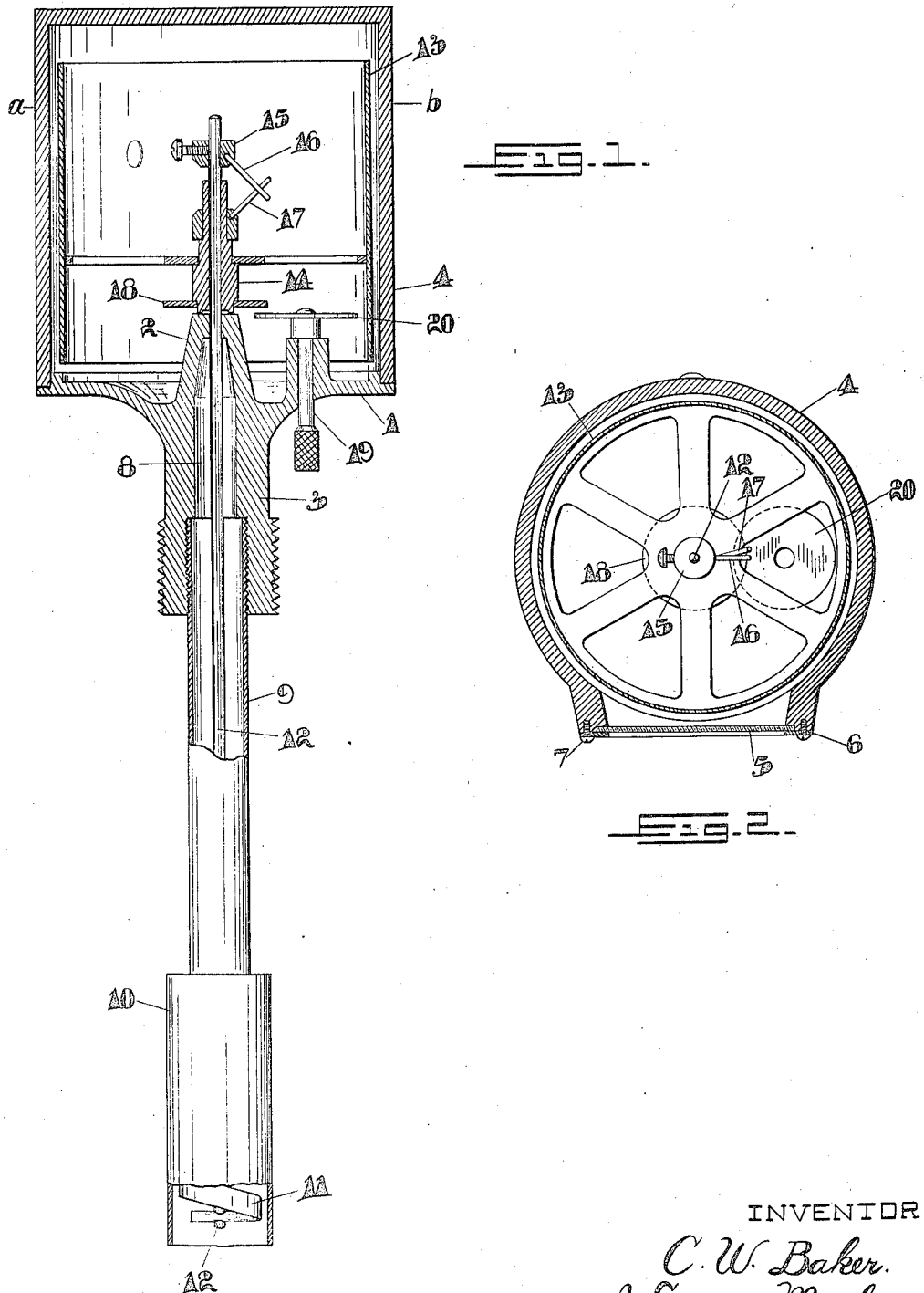
INVENTOR
C. W. Baker.
BY J. Edward Maybee.
ATTY.

July 31, 1923.
C. W. BAKER
TEMPERATURE INDICATING DEVICE
Filed May 17, 1922  2 Sheets-Sheet 2
1,463,189
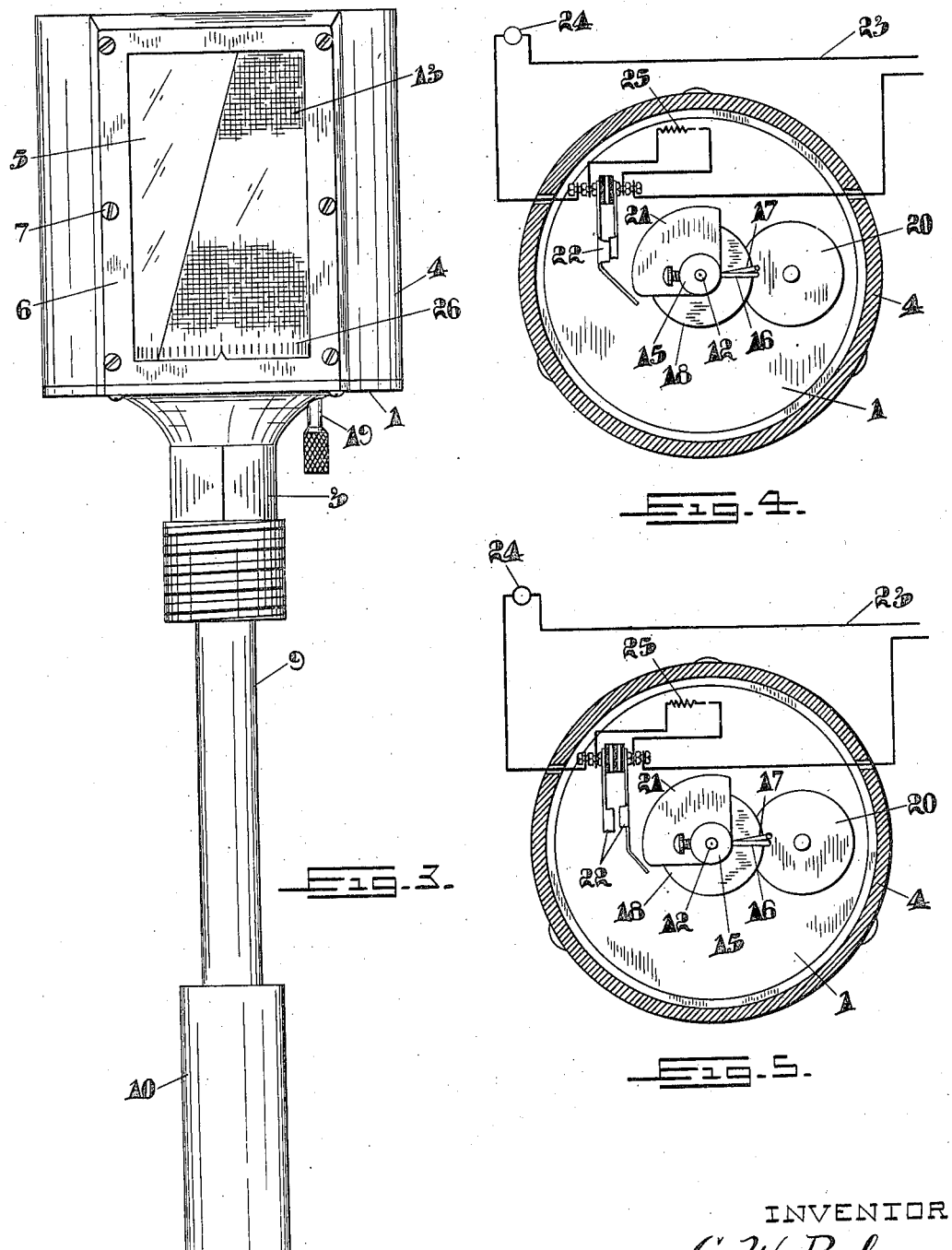
INVENTOR
C. W. Baker.
BY J. Edward Maybee
ATTY.

Patented July 31, 1923.

1,463,189

UNITED STATES PATENT OFFICE.

CAREY W. BAKER, OF ST. CATHARINES, ONTARIO, CANADA, ASSIGNOR TO PACKARD ELECTRIC COMPANY, LIMITED, OF ST. CATHARINES, CANADA.

TEMPERATURE-INDICATING DEVICE.

Application filed May 17, 1922. Serial No. 561,773.

*To all whom it may concern:*

Be it known that I, CAREY W. BAKER, of the city of St. Catharines, in the county of Lincoln, Province of Ontario, Canada, a subject of the King of Great Britain, have invented certain new and useful Improvements in Temperature - Indicating Devices, of which the following is a specification.

The object of my present invention is to devise means for indicating the highest temperature to which an electrical transformer, or other apparatus, to which it is applied, is subjected, and which will also give visible, and, if desired, audible indication of any dangerous rise in temperature in the interior of the transformer or apparatus, and the lineman or attendant thus warned should the temperature rise above a predetermined limit. As transformers are usually mounted on poles a considerable distance above the ground, an important feature of the invention is the arrangement of the visible indication so that it may be clearly seen from the ground, thus avoiding the necessity of the observer climbing the pole.

I attain my object by means of the constructions hereinafter described and illustrated in the accompanying drawings in which—

Fig. 1 is a vertical section of the preferred form of my improved indicating device;

Fig. 2 a horizontal section on the line *a—b* in Fig. 1;

Fig. 3 a side elevation of the device;

Fig. 4 a sectional detail similar to Fig. 2 showing a modification of the device for giving a signal at a distance, the electrical circuit being shown diagrammatically; and Fig. 5 a view similar to Fig. 4 showing a further modification.

In the drawings like numerals of reference indicate corresponding parts in the different figures.

1 is the base of my indicating device, which is provided on its upper side with a support 2 and on its lower side with a depending portion 3, the lower end of which depending portion is externally-threaded in order that it may be screwed into a suitably threaded opening in the transformer cover. The depending portion 3 above the threaded portion is of square, hexagon or other convenient shape in cross section so that a wrench may be applied thereto for screwing the device into position on the cover.

To the upper side of the base is applied the casing 4, which is open at one side, which opening is closed by a glass or other transparency 5, which is held in place by a retainer 6 secured to the casing by means of screws 7.

A passage 8 is formed through the support 2, the base 1 and the depending portion 3, the lower end of which is internally threaded to receive one end of a tube 9. To the lower end of this tube is secured a bulb 10.

In this bulb is secured a bi-metallic helix or spiral or other thermostatic or heat actuated element 11. To this element is secured the lower end of a vertical shaft 12, which shaft extends up through the tube 9; through the passage 8 into the upper part of the casing 4.

13 is a drum or cylinder, which is provided with a hub 14, the lower end of which is adapted to sit on the upper end of the support 2, the engaging surfaces being carefully polished so as to maintain the friction constant for long periods of time.

The shaft 12 passes through and extends above the hub 14 and has secured to its upper end a collar 15, from which extends a pin 16 which is adapted to engage a pin 17 extending from a point adjacent the upper end of the hub 14. The collar 15 may be held in place in any suitable manner, such, for example, as by a set screw as indicated. It will be noted on reference to the drawing that the collar 15 is spaced somewhat from the upper end of the hub 14.

Secured to or formed integral with the hub 14 adjacent its lower end is a friction disk 18. Vertically slidable in the base 1 is a spindle 19, on the upper end of which is formed a disk 20, adapted, when in raised position to engage the under side of the disk 18 and lift the hub 14 from engagement with the support 2. The lower end of the spindle will be provided with a suitable handle.

The drum 13 will have its outer surface of two contrasting colors, preferably black and white, and will be so positioned that the black will normally show through the glazed opening in the casing, but as the drum is rotated the white portion will gradually come into view. I prefer, however, to arrange the line of division between the black and white surfaces at other than a right angle to the top of the drum.

A portion of the drum is marked with graduations 26 and a hair line or other reading mark is provided in the opening so that the temperature within the transformer may be indicated.

The operation of the construction described is as follows: When the temperature in the transformer rises, the bi-metallic element 11 rotates the shaft 12, the pin 16 engaging the pin 17 to rotate the hub 14 with the drum 13 thereon. Normally the block portion of the drum will be exposed through the opening in the side of the casing. As the drum is thus rotated the white portion of the drum gradually comes into view, until when the temperature has reached a certain limit the black has entirely disappeared and only white shows through the opening. When a large portion of white is showing, the observer is given warning that the temperature in the transformer is nearing the danger point.

It will be noted, however, from the construction described and shown that the drum is only driven by the shaft in one direction, viz, to indicate higher temperatures, and therefore when the temperature of the transformer decreases, the drum remains in its position indicating the highest temperature which has occurred in the transformer or apparatus.

When the attendant or lineman desires to return the drum to its original position, he pushes up the spindle 19, the disk 20 on the upper end of which engages the disk 18, and by rotating the spindle the drum may be returned to its original position.

It will be noted from the construction described that the device is simple in construction, comprising very few parts, none of which is liable to get out of order.

It is sometimes desirable, however, that the signal be given at a distance from the transformer or apparatus to which the device is to be applied, and in other cases it is desirable to give an audible signal. I may therefore arrange my device as hereinafter described for attaining these desired results.

Referring particularly to Fig. 4, I secure to the hub 14 a cam 21 which is so shaped that when the temperature in the transformer reaches a predetermined height it will separate the normally closed electrical contacts 22 located in a suitable circuit 23, including a lamp 24 for giving a visible signal, which lamp may be replaced with a suitable bell or buzzer if it is desired to give an audible signal. The contacts 22 are paralleled by a lamp flasher of usual design, comprising a heater coil 25, an expanding element and flasher contacts. When my device is used with a transformer, voltage might be taken from the secondary leads of the transformer and would pass through the contacts 22, then down the pole to the signal lamp 24 at some convenient location and from there back to the other side of the transformer winding. When the predetermined temperature is reached, the cam 21 would open the contacts 22, bringing into operation the flasher. The lamp would continue flashing until the lineman or attendant arrived to correct the difficulty. The signal lamp might be one of the street lighting lamps which are usually mounted on the same pole which carries the transformer, and as long as the transformer was operating under normal conditions, the lamp would remain bright, but, when the transformer reached the predetermined temperature referred to the lamp would commence to flash off and on.

A modification is shown in Fig. 5. In this arrangement the contacts 22 are normally open and the cam 21 is used to close the contacts and thus illuminate the lamp. While the flasher is shown in the drawing, it might in this case be omitted, as the fact that the lamp 24 was illuminated would indicate an abnormal temperature in the transformer or apparatus.

With the constructions shown in Figs. 4 and 5, the drum 13 might, if desired, be omitted. It will also be evident that means other than the cam 21 might be provided for actuating the contacts to make or break the electric circuit.

What I claim as my invention is:—

1. In a temperature indicating device, the combination of a rotatably mounted shaft; heat actuable means adapted to rotate said shaft; indicating means; a member rotatably mounted on said shaft and adapted to actuate said indicating means in one direction; and a second member connected with said shaft, said second mentioned member being adapted to engage and actuate the first mentioned member but being free to return to normal position without said first mentioned member.

2. In a temperature indicating device, the combination of a rotatably mounted shaft; heat actuable means adapted to rotate said shaft; a member rotatable relative to said shaft; a second member connected with said shaft, said second mentioned member being adapted to engage and actuate the first mentioned member in one direction; said second member and shaft being free to return to normal position without the first mentioned member; and an indicating drum rotatable with said first mentioned member.

3. In a temperature indicating device, the combination of a rotatably mounted shaft; heat actuable means adapted to rotate said shaft; a member rotatable relative to said shaft; a second member connected with said shaft, said second mentioned member being adapted to engage and actuate the first mentioned member in one direction; said second member and shaft being free to return to normal position without the first mentioned member; an indicating drum rotatable with said first mentioned member; and means for returning the first mentioned member to original position.

4. In a temperature indicating device, the combination of a casing; a rotatably mounted shaft; heat actuable means adapted to rotate said shaft; a member having a friction disk thereon and rotatable relative to said shaft; a second member connected with said shaft, said second mentioned member being adapted to engage and actuate the first mentioned member in one direction; an indicating drum rotatable with said first mentioned member; a spindle slidably and rotably mounted in said casing; a disk on the upper end of said spindle, said disk being adapted to be engaged with said friction disk to return the first mentioned member to original position.

5. In a temperature indicating device, the combination of a casing; a rotatably mounted shaft; heat actuable means adapted to rotate said shaft; a member having a friction disk thereon and rotatable relative to said shaft; a second member connected with the shaft, said second member being adapted to engage and actuate the first mentioned member in one direction; indicating means actuable by said first mentioned member; a spindle slidably and rotatably mounted in said casing; a disk on the upper end of said spindle, said last mentioned disk being adapted to engage the first mentioned disk to return the first mentioned member to original position.

Signed at St. Catharines this 1st day of May 1922.

CAREY W. BAKER.